Patented Oct. 10, 1950

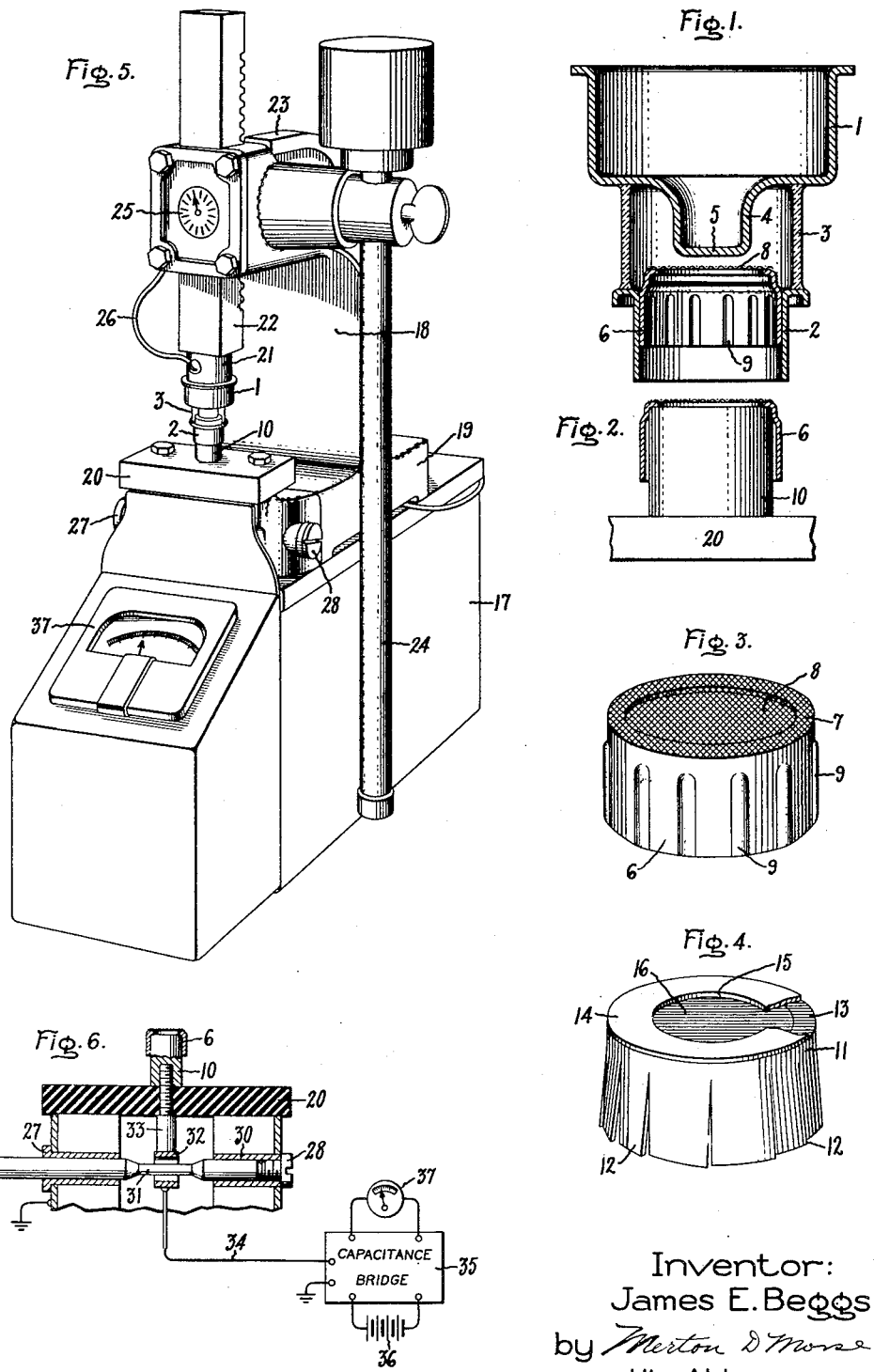

2,525,441

UNITED STATES PATENT OFFICE 2,525,441

CAPACITANCE MEASURING APPARATUS

James Emory Beggs, Schenectady, N. Y., assignor to General Electric Company, a corporation of New York Application July 12, 1945, Serial No. 604,676, which is a division of application Serial No. 548,859, August 10, 1944. Divided and this application September 6, 1947, Serial No. 772,539

3 Claims. (Cl. 175—183)

The present application is a division of my co-pending application Serial No. 604,676, filed July 12, 1945, which is in turn a division of my application Serial No. 548,859, filed August 10, 1944, now Patent No. 2,402,119.

The invention relates to improved capacitance measuring apparatus particularly adapted for adjusting a pair of movable elements, such as the electrodes of an electric discharge device to provide a predetermined inter-electrode capacitance.

It is an object of my invention to provide new and improved capacitance apparatus.

It is another object of my invention to provide new and improved capacitance measuring apparatus which is not affected by changes in atmospheric conditions.

It is a still further object of my invention to provide new and improved apparatus for substituting and adjusting an unknown capacitance until it corresponds to a predetermined standard capacitance.

For a better understanding of my invention reference may be had to the following description taken in connection with the accompanying drawing, and its scope will be pointed out in the appanded claims. Fig. 1 of the drawing is an elevational view in section of a discharge device adapted for assembly on apparatus embodying my invention; Fig. 2 illustrates the grid of the device of Fig. 1 assembled on a part of the capacitance measuring apparatus; Figs. 3 and 4 illustrate modified forms of the grid structure; Fig. 5 is a perspective view of capacitance measuring apparatus embodying my invention; and Fig. 6 is a sectional view of a portion of the apparatus shown in Fig. 5.

Referring particularly to Fig. 1, there is shown a portion of an electronic tube having an anode shell 1 and a grid shell 2 maintained in spaced relation by a vitreous cylinder 3 sealed between opposed flanged portions of the shells. The shells 1 and 2 are formed preferably of a suitable metallic material, such as copper or silver-plated steel, and the seal 3 is formed of a suitable insulating material which wets with the plating of the members 1 and 2, such as, for example, a boro silicate glass. The anode shell 1 is hollow and has a neck portion 4 which terminates in an active anode or electron receiving portion 5. Positioned within the grid shell 2, in a manner to be explained more in detail hereinafter, is a grid assembly comprising a tubular conductive member 6 flared inwardly at its upper end to form a flange 7 across which is sealed a grid 8. The cylinder 6 around its outer periphery is provided with a plurality of ridges or corrugations 9 which maintain the cylinder 6 in a desired position within the grid shell 2 during assembly operation.

In Fig. 2 the grid cylinder 6 is shown in position on a stud 10 of a capacitance measuring device embodying my invention and adapted for adjusting the position of the grid assembly within the grid shell 2. Fig. 3 is a perspective view of the grid assembly shown in Figs. 1 and 2 and illustrates more clearly the corrugations 9 on the tube 6 and the flange 7 across which is stretched a mesh grid 8. The grid 8, preferably while it is under tension, is soldered to the upper face of the flange 7 during the construction of the grid assembly.

Fig. 4 shows an alternative grid assembly for use in a tube having planar electrodes and which comprises a grid cylinder 11 having a plurality of serrations or louvers 12 and a flange 13 at its upper end. A circular washer 14 having a central opening 15 has soldered thereto a plurality of closely spaced parallel grid wires 16. Preferably, the grid wires 16 are united to the washer 14, as by soldering, and thereafter the composite grid washer structure is placed upon the flange 13 and attached thereto as by welding.

In Fig. 5 there is shown apparatus embodying my invention, and particularly useful in assembling the portion of the tube structure shown in Fig. 1 to obtain predetermined spacing between the anode surface 5 and the grid 8 to provide a desired capacitance between these electrodes. The apparatus of Fig. 5 includes a base portion 17 which contains a source of unidirectional potential and a capacitance bridge (not shown). A press 18 supported upon the base 17 includes a base portion 19 upon which is mounted a block 20 of insulation material which carries the stud 10, and a reciprocating plunger 21 secured to the lower portion of a rack member 22. The rack member 22 engages a driving pinion (not shown) in the head 23 of the press and is actuated by means of a lever 24. The vertical movement of the plunger 21 may be measured by means of a suitable micrometer 25. The plunger 21 is adapted to fit into the anode shell 1 to place the grid shell 2 over the grid cylinder 6, the latter being supported on the stud 10. Electric connection of the plunger 21 for purposes to be pointed out later is made by means of a lead 26 which is grounded to the press 18.

Located in the base portion 19 of the press is a sleeve 27 for receiving a capacitance rod and a stop 28 for limiting the motion of that rod. This portion of the apparatus is shown in enlarged sectional view in Fig. 6, the capacitance rod 29 being shown in position within the left-hand sleeve 27 and the right-hand sleeve 30 and abutted against the stop 28. The capacitance rod 29 has an intermediate portion 31 of reduced diameter connecting two portions of larger diameter which are machined to make a good fit with the inner surface of the sleeves 27 and 30. Cooperating with the intermediate portion 31 to form therewith an air core capacitance is an annular metallic member 32 attached to a stud 33 which is in screw-threaded engagement with the stud 10 and supported from the block 20 of insulating material. The fixed annular electrode 32 has a central aperture which likewise is of the inner diameter of the sleeves 27 and 30 so that, in positioning the capacitance rod 29 in the sleeves 27 and 30, the right-hand end of the rod passes through the opening of the electrode 32 to check its concentricity with the movable electrode 31 of the capacitance. The fixed electrode 32, which is maintained at a positive potential, is connected by means of a lead 34 to a capacitance bridge 35 supplied with operating potential from any suitable source represented conventionally by the battery 36. The capacitance bridge 35 is of conventional form and the details thereof are not shown in the drawings. The bridge includes a meter 37 connected across opposite points of the arms thereof in the usual manner. The capacitance formed by the electrodes 31, 32 is connected in one of the arms of the capacitance bridge 35 in a well-known manner and is in parallel with the fixed capacitance of the press 18.

In the operation of the apparatus shown in Figs. 5 and 6 to obtain a desired interelectrode capacitance of an electron tube, according to one method, first, a capacitance rod, having an intermediate section 31 of a diameter sufficient to form with the electrode 32 the exact value of capacity which is desired for an electronic tube, is placed in position in the sleeves 27 and 30 and the reading of the meter 37 is noted. Thereafter, the rod 29 is removed, a grid cylinder 6 is placed on the stud 10, an anode and grid shell assembly is placed over the grid cylinder, and the plunger 21 is lowered by means of a lever 24. It is apparent that the stud 10, which is at the same electrical potential as the electrode 32, is insulated from the grounded plunger 21 of the press 18 by the vitreous cylinder 3 of the electron tube structure. A capacitance, therefore, is formed between the anode shell and the grid shell and cylinder, which capacitance is substituted for the known capacity of the electrodes 31, 32 in the same arm of the capacitance bridge. As the plunger 21 is lowered, the reading of the meter 37 is noted until a deflection is obtained which is the same as that obtained with the standard capacity of the electrodes 31, 32 present in the bridge arm. Since the interelectrode capacitance of the tube assembly is substituted for the previous standard capacity, when the same reading is obtained, the interelectrode capacity is fixed at the desired value. It is apparent that, with this particular method of adjusting the capacitance, the presence of any capacitance of the press and wiring is balanced out for the two readings. During the positioning of the grid cylinder in the grid shell 2, the corrugations or ridges 9 or the spring fingers 12, as the case may be, by engaging the inner walls of shell 2 support the cylinder 6 or 11 therein. When a desired interelectrode spacing is obtained the tube structure is removed from the press 18 and the grid cylinder is spot-welded in place.

The above-described method for obtaining a desired interelectrode capacitance is particularly useful in constructing an electronic tube for low frequency purposes, where the interelectrode capacitance includes the effect of seals, the envelope, and other portions of the tube. For tubes constructed for high frequency work, where the seal 3 may be displaced from the active electrode parts by a distance that is an appreciable portion of a wave length and its presence has little or no effect upon the desired value of interelectrode capacitance, the following method of assembling a tube, which balances out the capacitance due to the presence of the seals and envelope of a tube, is of importance. In this method, with a capacitance rod 29 inserted to give a desired interelectrode capacitance across the capacitance bridge arm, the grid cylinder 6 is placed in position on a stud 10 and an anode grid assembly is placed thereover and located by means of the plunger 21 until the active anode surface 5 and the grid 8 are separated by a substantial distance. In this manner the capacity of the fixed tube elements is connected in parallel with the standard reference capacity. The capacitance bridge is then adjusted to give a desired deflection on the meter 37, preferably a mid-scale reading. The arbitrary reading thus obtained includes both the fixed capacities of the tube elements and the standard capacity between the electrodes 31, 32. The rod 29 is then removed to remove the standard capacity from the bridge arm and an interelectrode capacitance of the same value is substituted therefor by lowering plunger 21 to bring the grid 8 closer to the anode surface 5 until the same deflection of meter 37 is obtained. This gives a true measurement of the capacitance existing solely between the grid 8 and the anode surface 5, the value of which it is desired to set equal to the known standard or reference capacity.

In the use of the apparatus for positioning the electrodes in tubes, standard capacity elements or rods 29 having intermediate portions 31 of different diameters, of course, may be employed to obtain different interelectrode capacities of the tubes. One of the important features of the capacity balancing device is the fact that the sole dielectric which exists between the active electrodes 31, 32 is the same as that which exists between the anode surface 5 and the grid 8 so that the capacity setting is independent of temperature and humidity conditions. This dielectric, being air, is a relatively stable one. The effect of the dielectric block 20 formed of a material which ordinarily is effected by temperature and humidity is balanced out for all measurements. Another advantage of the use of the apparatus shown is that each electronic tube, during its construction, is adjusted to give the exact value of interelectrode capacitance desired. This value may take into account either the presence of the seals and envelope of the tube or may balance out the effect of these elements of the tube.

In some cases it may be desirable to assemble tubes according to the physical spacing between the anode and grid, rather than to obtain a desired interelectrode capacitance. For such cases also, the apparatus of Fig. 5 may be employed, the micrometer 25 being used to measure the spacing between electrodes. The grid-to-anode spacing may be alternatively established by means of high frequency resonant circuits or any other desired means. It has been found that in the use of this particular apparatus and method for assembling electronic tubes, tubes have been manufactured which approach more closely to a desired uniform characteristic than those manufactured by any other apparatus or method heretofore employed.

While I have shown a particular embodiment of my invention, it will, of course, be understood that I do not wish to be limited thereto since various modifications may be made and I contemplate by the appended claims to cover any such modifications as fall within the true spirit and scope of my invention.

What I claim as new and desire to secure by Letters Patent of the United States is:

1. A capacitance measuring device comprising a bridge circuit having connected in one arm thereof a standard capacitance, means for connecting a capacitance to be adjusted in parallel with said standard capacitance, said standard capacitance comprising a fixed tubular electrode, a removable electrode, means for aligning said removable electrode in position with said fixed electrode, said means comprising a pair of sleeve members, said removable electrode being constituted by a metallic rod having end portions adapted to fit in said sleeve members and an intermediate portion of reduced diameter, said fixed electrode concentrically surrounding said intermediate portion when said rod is positioned within said sleeve members.

2. A reference capacitance for a capacitance measuring device comprising a fixed electrode, a removable electrode, a pair of sleeves positioned on opposite sides of said fixed electrode for receiving opposite ends of said removable electrode and supporting said removable electrode in spaced relation with respect to said fixed electrode, and means for connecting a capacitance to be measured in parallel with said reference capacitance including a support conductively connected with said fixed electrode.

3. In a capacitance measuring device, the combination comprising an insulating member, a conducting structure supported from said member and providing one element of a capacitor and a support for a conducting member which is to form one element of a second capacitor, a removable electrode supported in spaced and insulated relation with respect to said first mentioned element to provide therewith a standard capacitor, and a second support movable with respect to said first support for adjusting the position between elements carried on said supports to adjust the capacitance therebetween.

JAMES EMORY BEGGS.

REFERENCES CITED

The following references are of record in the file of this patent:

UNITED STATES PATENTS

| Number | Name | Date |
| --- | --- | --- |
| 1,757,659 | Edenburg | May 6, 1930 |
| 2,018,673 | Howe | Oct. 29, 1935 |
| 2,076,944 | Howe | Apr. 13, 1937 |
| 2,146,073 | Jennens et al. | Feb. 7, 1939 |
| 2,149,702 | Maris | Mar. 7, 1939 |
| 2,283,086 | Oliphant | May 12, 1942 |